(12) United States Patent
Takemura et al.

(10) Patent No.: US 6,543,831 B2
(45) Date of Patent: Apr. 8, 2003

(54) WINDSHIELD MOUNTING STRUCTURE FOR VEHICLES

(75) Inventors: Hiroo Takemura, Saitama (JP); Tsuguhito Ichiriki, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/961,450

(22) Filed: Sep. 25, 2001

(65) Prior Publication Data

US 2002/0041107 A1 Apr. 11, 2002

(30) Foreign Application Priority Data

Sep. 25, 2001 (JP) ........................................ 2000-290301

(51) Int. Cl.[7] ............................................... B62J 17/04
(52) U.S. Cl. ...................................................... 296/78.1
(58) Field of Search ........................................ 296/78.1

(56) References Cited

U.S. PATENT DOCUMENTS 4,696,509 A * 9/1987 Yagasaki et al. ............ 296/78.1
4,707,017 A * 11/1987 Minobe et al. ......... 296/78.1 X
4,830,423 A * 5/1989 Nebu et al. ................. 296/78.1

FOREIGN PATENT DOCUMENTS

JP 3-27030 6/1991

* cited by examiner

Primary Examiner—Dennis H. Pedder
(74) Attorney, Agent, or Firm—Birch, Stewart Kolasch & Birch, LLP

(57) ABSTRACT

A windshield mounting structure for vehicles in which a windshield as a sheet for protection from the wind is mounted between a vehicle body frame and a cowling attached at the front of the vehicle body frame. The cowling is attached to a retaining plate, which is rockably mounted on the vehicle body frame and positioned opposite to the front of the windshield. A operating lever is provided for pressing the retaining plate against the windshield to hold the windshield in a fixed position, and for releasing the retaining plate from the windshield so that the windshield height can be adjusted up or down. A ratchet mechanism is provided for supporting the windshield when it is released, and for adjusting the windshield to a desired position. This combination of elements and configuration provides for a structure that increases the freedom of design of the exterior components of the vehicle, particularly the cowling.

10 Claims, 8 Drawing Sheets

WINDSHIELD MOUNTING STRUCTURE FOR VEHICLES

BACKGROUND OF THE INVENTION

1. Field of the Invention

The present invention relates to a windshield mounting structure for vehicles, and more particularly to a windshield mounting structure providing for mounting and adjusting the height of a windshield in a vehicle such as a motorcycle.

2. Description of the Prior Art

One example of a conventional windshield mounting structure capable of adjusting the height of the windshield mounted at the front of a vehicle such as a motorcycle is proposed in Japanese Examined Utility Model Publication No. Hei 3-27030.

In this prior art structure, the windshield is mounted to provide for moving the windshield vertically in relation to the cowling and for covering the front part of the vehicle body frame. A crank plate is provided on the cowling for holding the windshield between the cowling and the crank plate. A lock member is disposed between the crank plate and the cowling for pressing the crank plate into contact with the windshield. In this structure, the cowling which is an exterior component of the vehicle, is used as a stiffening member for fixing the screen. Thus, the material and design of the cowling that can be used in this conventional windshield mounting structure is limited.

SUMMARY AND OBJECTS OF THE INVENTION

In view of this and other problems associated with the prior art, it is an object of the present invention to improve on the design and materials used in a windshield mounting structure for vehicles.

To accomplish this object, the windshield mounting structure for vehicles of the present invention is provided with a screen as the windshield mounted between the vehicle body frame and the cowling attached at the front of the vehicle body frame. The windshield thus mounted is capable of being moved up and down in the direction of the windshield surface, and in relation to the vehicle body frame and the cowling. The windshield is held and fixed between the vehicle body frame and the cowling. In this windshield mounting structure, a retaining plate which is fixedly attached to the cowling is disposed on the vehicle body frame, opposite to the front of the windshield, and is pressed against the windshield.

A part of the retaining plate is rockably supported in relation to the vehicle body frame, and is provided with a rocking mechanism which is located in a position apart from the rockably supported position. The rocking mechanism can be operated to alternatively move the retaining plate toward or away from the vehicle body frame. The rocking mechanism is further provided with a lock mechanism for holding the retaining plate in fixed contact with the windshield.

The windshield mounting structure for vehicles of the present invention also includes a stay attached for mounting the retaining plate and the rocking mechanism at the front of the vehicle body frame.

Further a ratchet mechanism is placed between the windshield and the vehicle body frame to provide for adjusting of the vertical position of windshield to a plurality of positions. To minimize friction between the windshield and the vehicle body when the windshield is moved up or down, friction reducing sheets are affixed on the contact surfaces of the windshield and the vehicle body frame.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

One preferred embodiment of the present invention will hereinafter be explained with reference to the accompanying drawings.

Figure 1:
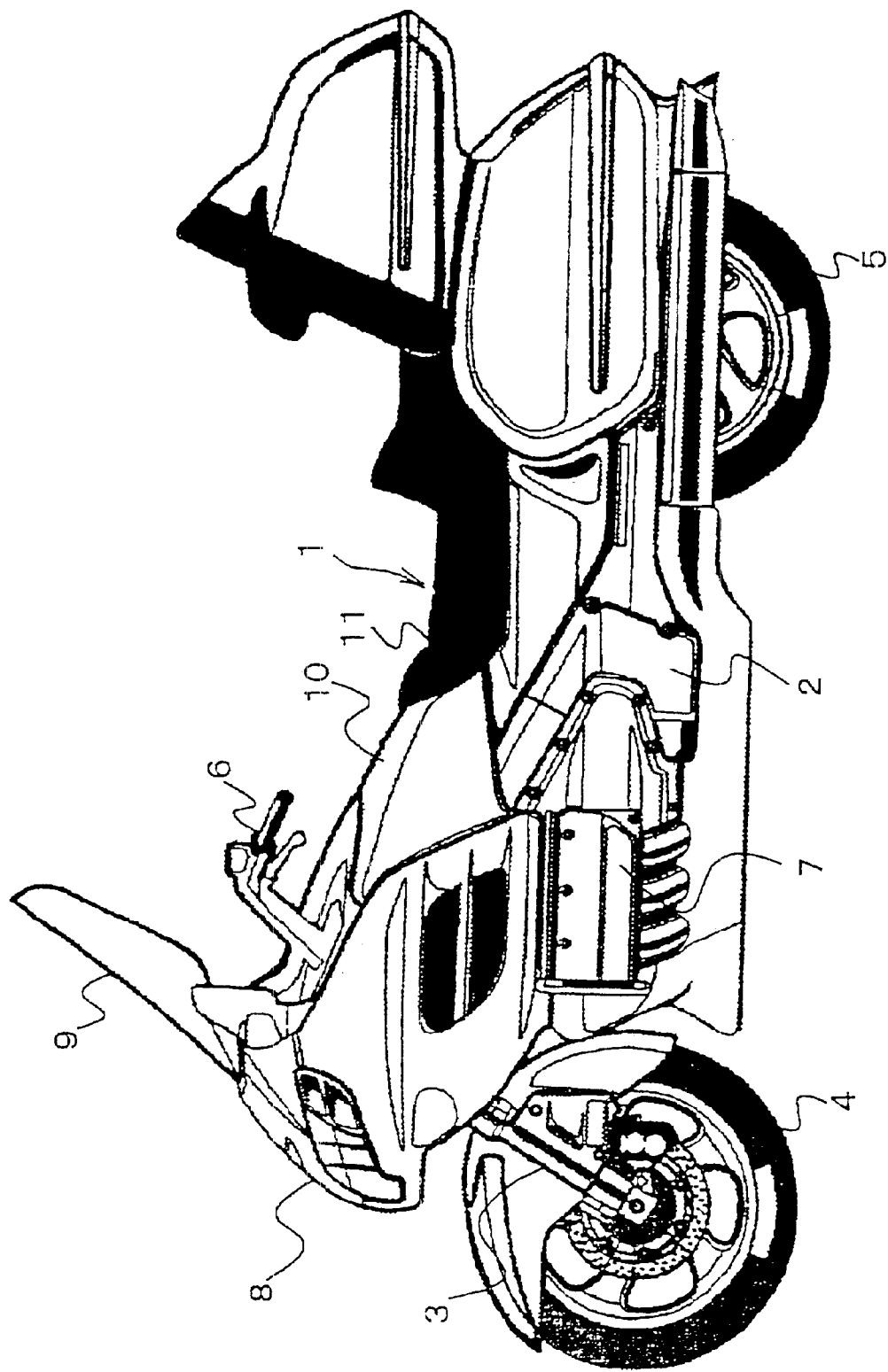
FIG. 1 is a side view of a motorcycle showing one embodiment of the present invention.

As illustrated in FIG. 1, the vehicle to which the present embodiment is a motorcycle 1, and is comprised of a vehicle body frame 2, a front wheel 4 mounted at the front of the vehicle body frame 2 through a front fork 3, and a rear wheel 5 mounted at the lower rear of the vehicle body frame 2 through an unillustrated rear fork. A steering handlebar 6 is attached on the upper part of the front fork 3, an engine 7 is mounted at the central part of the vehicle body frame 2, and a cowling 8 is attached to cover the front of the vehicle body frame 2. A windshield 9 is mounted between the cowling 8 and the vehicle body frame 2, ahead of a rider of the motorcycle 1. A tank cover 10 is attached at the upper part of the vehicle body frame 2 to the rear of the steering handlebar 6, and a seat 11 is mounted to the rear of the tank cover 10. The windshield mounting structure of the present embodiment is mounted between the vehicle body frame 2 and the cowling 8.

The windshield 9 thus mounted is relatively movable up and down in the direction of the windshield surface in relation to the vehicle body frame 2 and the cowling 8. It is fixedly held between the vehicle body frame 2 and the cowling 8. A retaining plate 12 is attached on the vehicle body frame 2, opposite to the front of the windshield 9, and is pressed against the windshield 9 to retain the windshield 9. The cowling 8 is secured on the retaining plate 12 (shown in FIG. 2).

Next the windshield mounting structure will be explained in detail. In the present embodiment, a first stay 13 extended forward is attached at the front of a head pipe 2a located at the front of the vehicle body frame 2. A second stay 14 is oppositely installed above the first stay 13.

The first stay 13 is comprised of a main pipe 13a extended forward of the head pipe 2a, a connecting member 13b formed in a U-shaped cross section, and a sub pipe 13c fixedly attached to the connecting member 13b and disposed nearly orthogonally to the main pipe 13a. A pair of brackets 15 spaced apart and projecting from upper and lower positions at the front part of the head pipe 2 are inserted into the base end section of connecting member 13b. Bolts 16 integrally mount the connecting member 13b and each bracket 15. Further, a locking projection 15a extending upwardly is integrally formed in the upper part of the bracket 15. The locking projection 15a fits in a locking hole 17 formed in the connecting member 13b, to thereby lock the connecting member 13b to the head pipe 2a.

Figure 3:
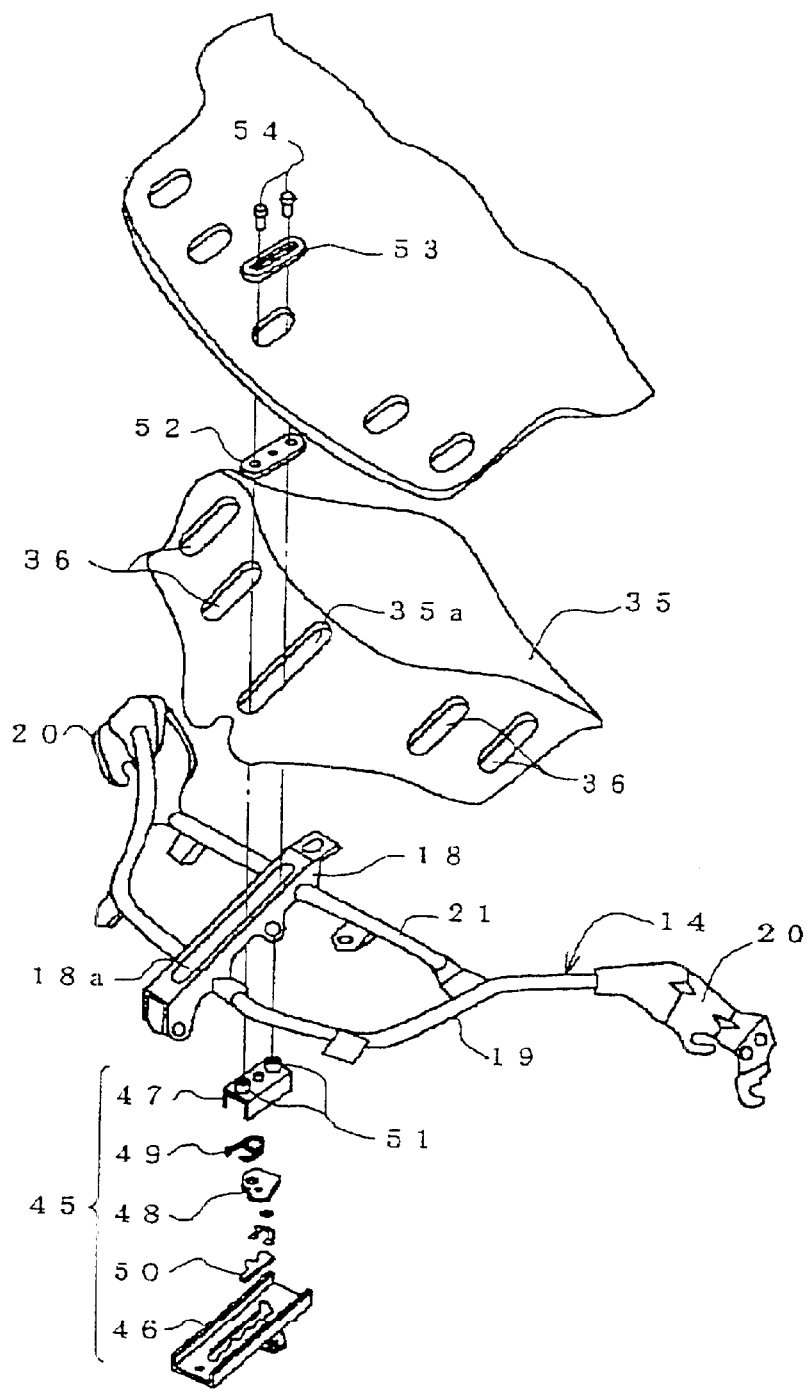
FIG. 3 is an exploded perspective view of a major portion showing one embodiment of the present invention.
Figure 4:
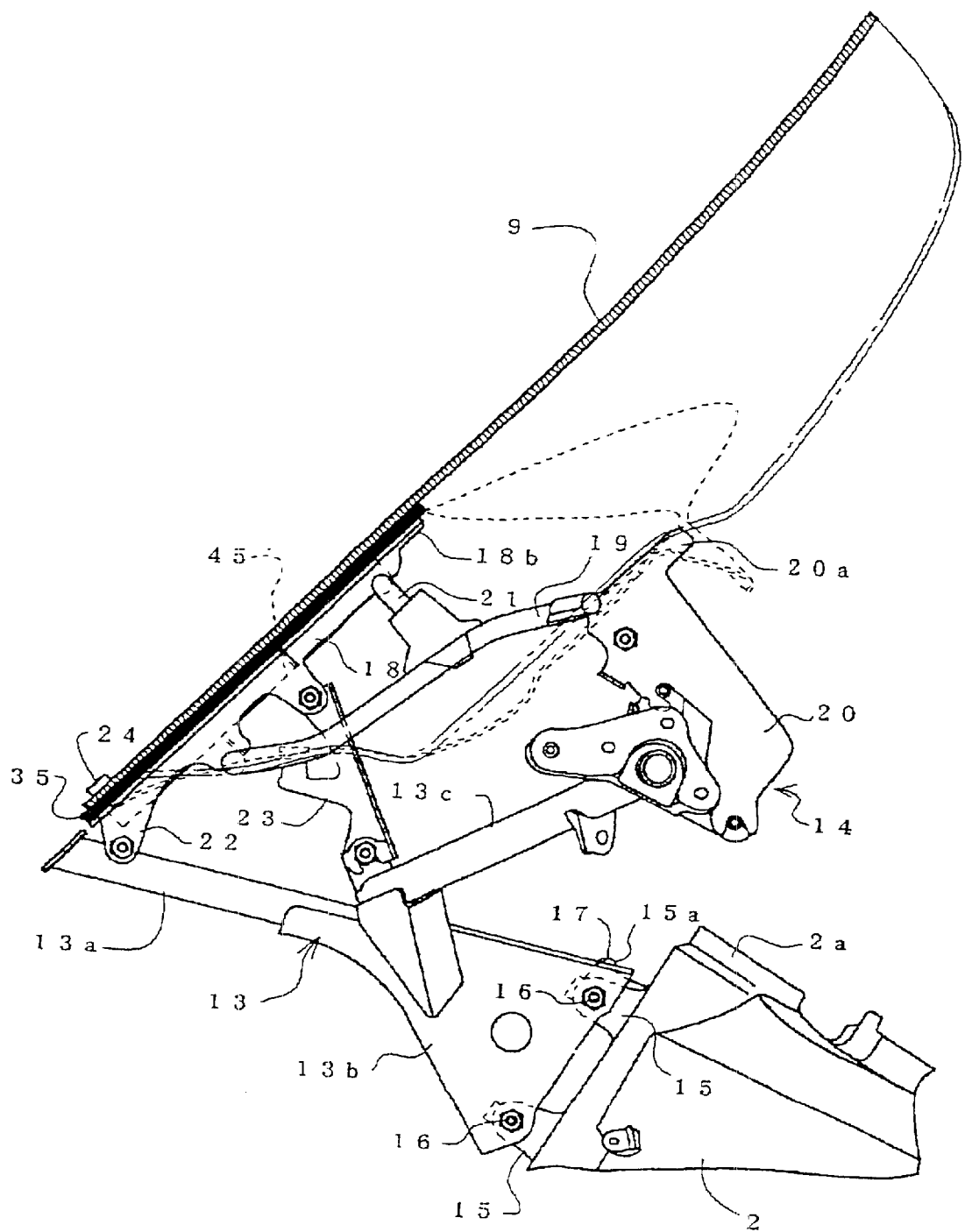
FIG. 4 is a sectional view of a major portion of the present invention viewed from the side.

The second stay 14, as shown in FIG. 3 and FIG. 4, is disposed along the sub pipe 13c of the first stay 13. A housing box 18 is mounted at the central part of first stay 13 and has a length which passes through the axis of the main pipe 13a of the first stay 13. As can be seen in FIG. 3, housing box 18 has a cross section formed in an inverted U-shape.

On the underside of the housing box 18, at about the midway portion in the direction of its length, a support pipe 19 is integrally installed extending laterally from both sides of the housing box 18. On both ends of the Support pipe 19 a connecting plate 20 is integrally attached. The connecting plate 20 is fixed on both sides of the sub pipe 13 portion of first stay 13. On the underside of the housing box 18, near the upper end part in the direction of its length, a sub pipe 21 is integrally attached for connecting both end parts of the support pipe 19.

Further, the lower end part of the housing box 18 is connected to the forward end part of the main pipe 13a through a bracket 22. The housing box 18 is also connected to the sub pipe 13c of the first stay 13 by means of a reinforcing plate 23 in a position above the connecting portion of the supporting pipe 19.

Figure 2:
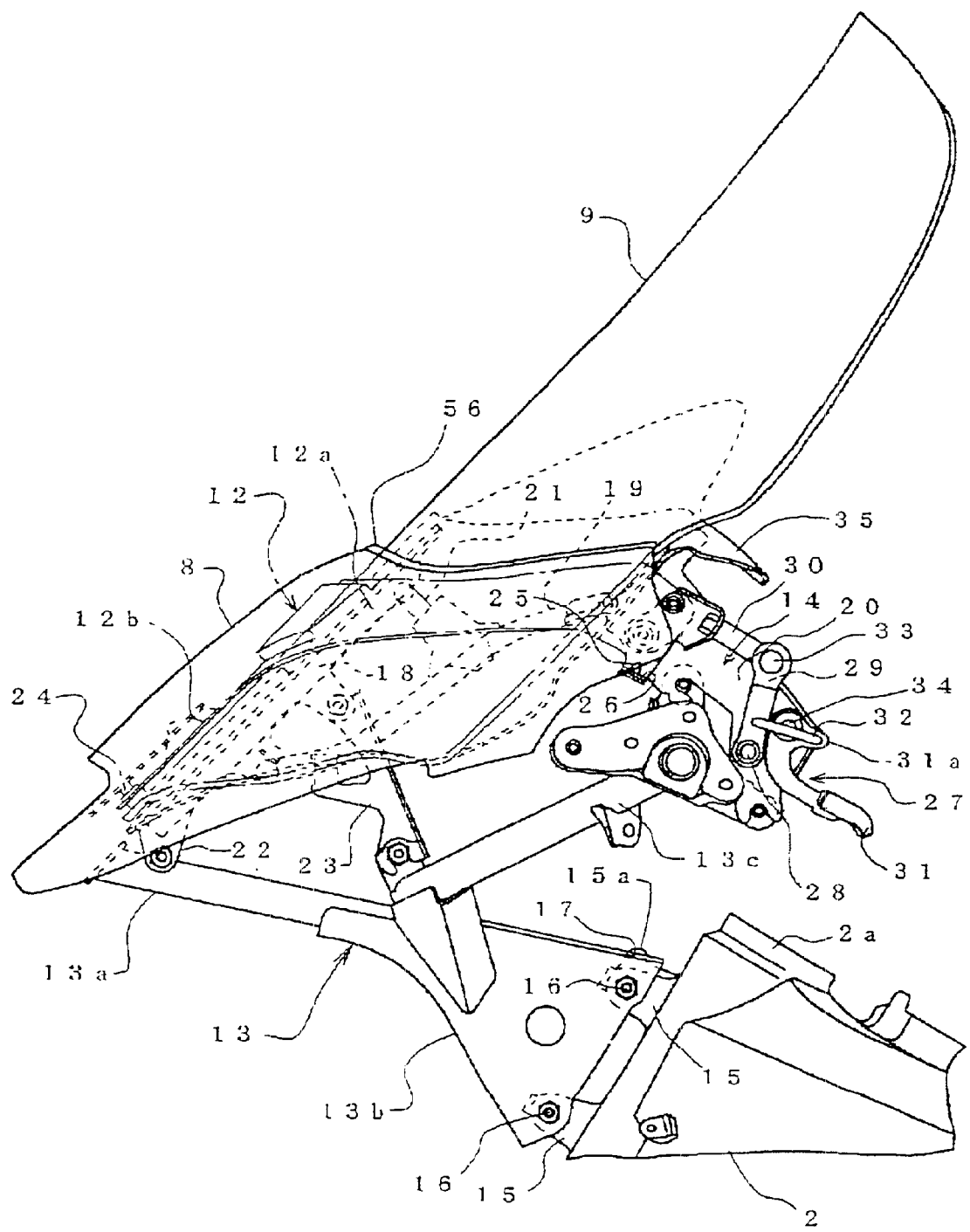
FIG. 2 is an enlarged side view of a major portion of one embodiment of the present invention.

As shown in FIG. 2, the retaining plate 12 is comprised of a pressing portion 12a disposed to cover the second stay 14, and a support portion 12b extending downwardly from about the midway portion of the pressing portion 12a. The forward end part of the support portion 12b is fitted in a support pin 24 projecting upwardly at the lower end part of the second stay 14, and is rockably supported in a nearly vertical plane, on the center of the support pin 24. Both ends of the pressing portion 12a overlap the upper surface of either connecting plate 20 provided on both ends of the second stay 14. An engaging piece 26 is integrally formed at either end of the pressing portion 12a. Engaging piece 26 engages with a lock pin 25 projecting on each connecting plate 20 of the second stay 14 when the pressing portion 12a is rocked toward the second stay 14. Also, the upper surface of the retaining plate 12 is integrally secured the cowling 8 by a plurality of fastening means such as screws.

Also as shown in FIG. 2, a rocking mechanism 27 is provided between both ends of the retaining plate 12 and the connecting plate 20, for rocking the retaining plate 12, and thereby moving the pressing portion 12a toward and away from the second stay 14. The rocking mechanism 27 is comprised of a link plate 29 rockably attached to the connecting plate 20 through a pin 28, and a connecting rod 30 which rotatably connects the rocking end of the link plate 29 with the end of the retaining plate 12. An operating lever 31 rotatably mounted on the connecting plate 20, and provides for actuating the link plate 29. The rocking mechanism also includes a link rod 32 for transmitting the rotational motion of the operating lever 31 to the link plate 29.

More specifically, the rocking end of the link plate 29 is bifurcated. This forked end of link plate 29 rotatably supports both ends of the connecting pin 33 which is installed to one end of the connecting rod 30.

The operating lever 31 is rockably supported on the connecting plate 20 through a pin 34, and has a connecting arm 31a extending from the center of the pin in the radial direction of rocking. The forward end of the connecting arm 31a is connected, by the link rod 32, to the middle part in the direction of length of the link plate 29.

Further, when the retaining plate 12 is pulled close to the second stay 14, the operating lever 31 is held in contact with the link plate 29, thereby preventing its rotation and thus holding the retaining plate 12 against second stay 14.

The positional relation of both ends of the link rod 32 and the pin 34 act to lock the operating lever 31 against the link plate 29 preventing the retaining plate 12 from moving away from the second stay 14. Thus, the combination of the link plate 29, the connecting rod 30, the operating lever 31, and the link rod 32 provide an effective locking mechanism for the rocking mechanism. The second stay 14 is also fixedly attached a meter visor 35 located behind the windshield 9, the windshield 9 against the retaining plate 12.

Figure 5:
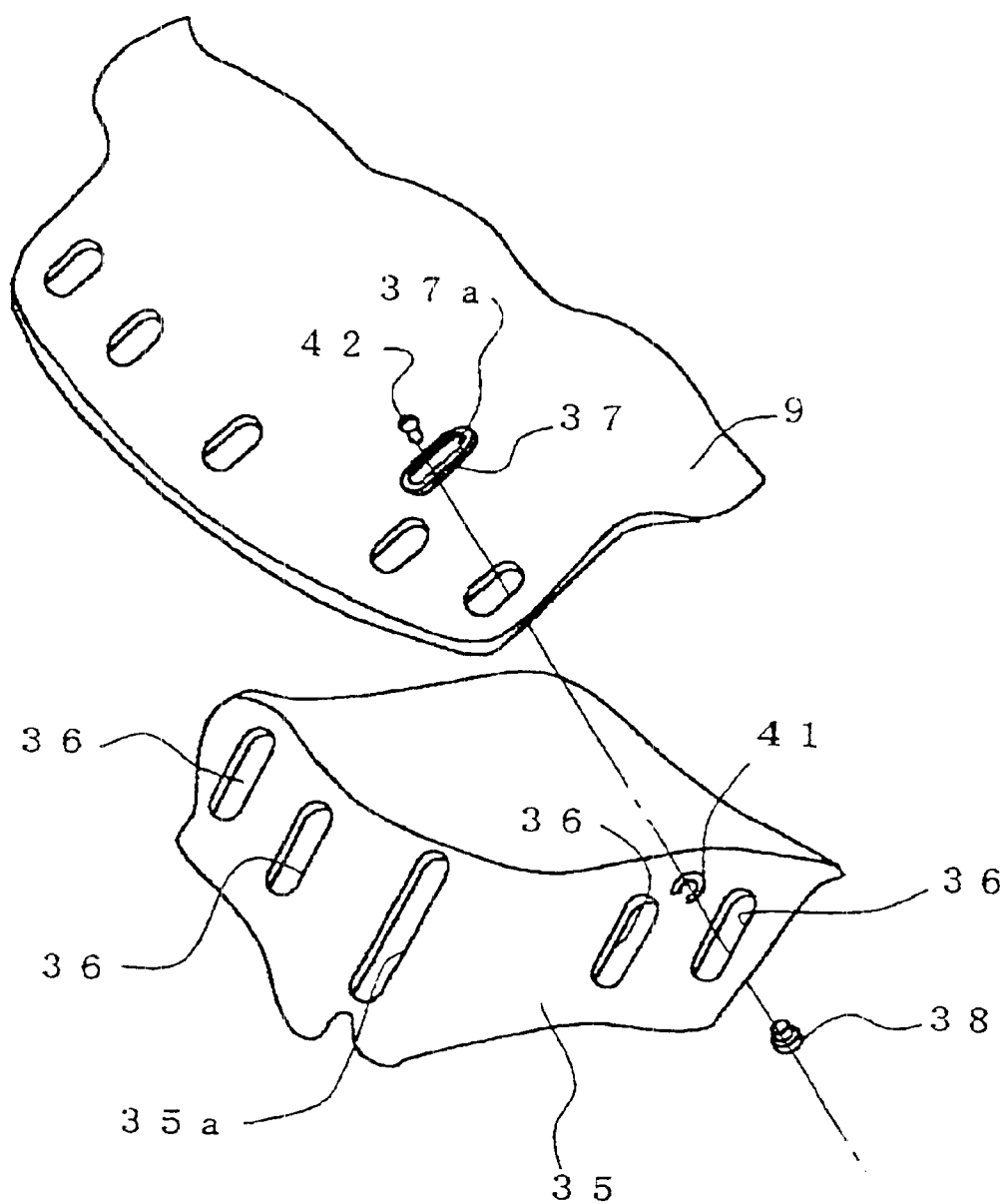
FIG. 5 is an exploded perspective view of the present invention showing a connecting structure, partly omitted, between a meter visor and a windshield.
Figure 6:
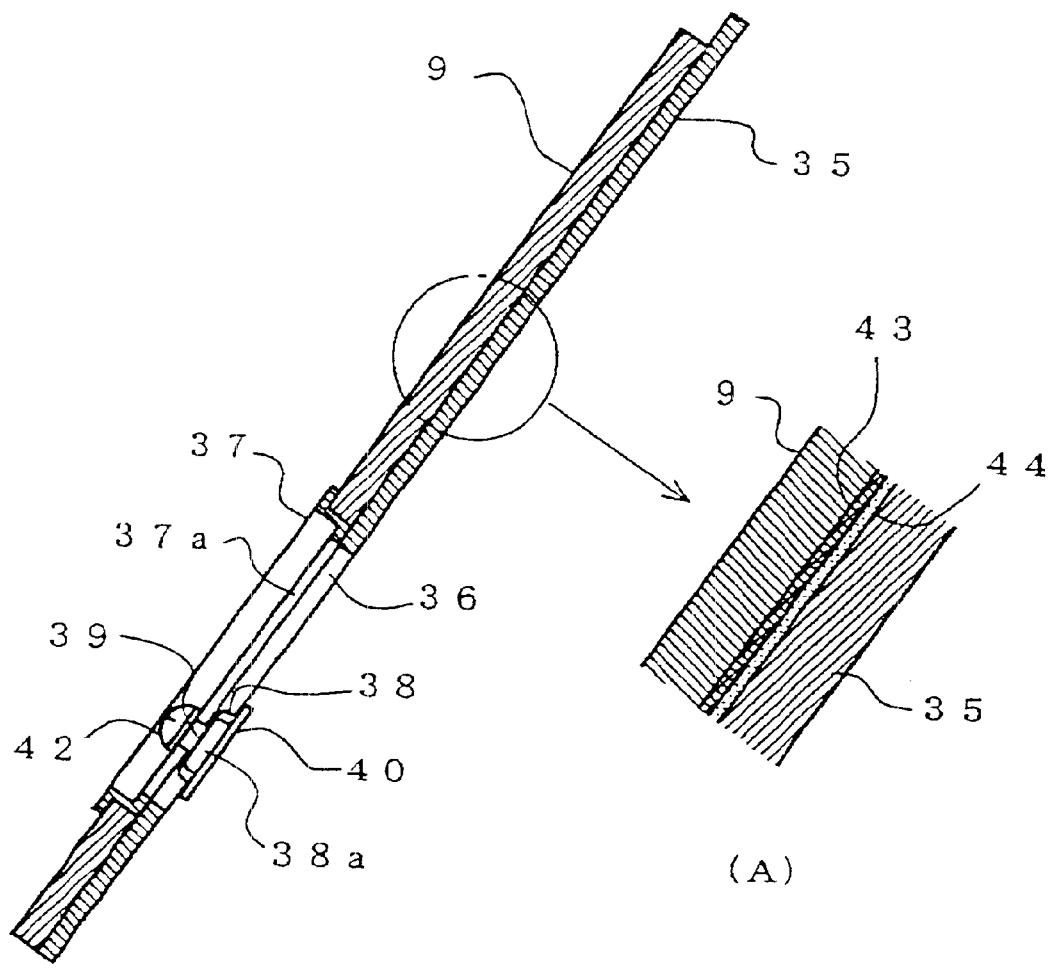
FIG. 6 is an enlarged longitudinal sectional view showing the connecting structure of the meter visor and the windshield.
Figure 7:
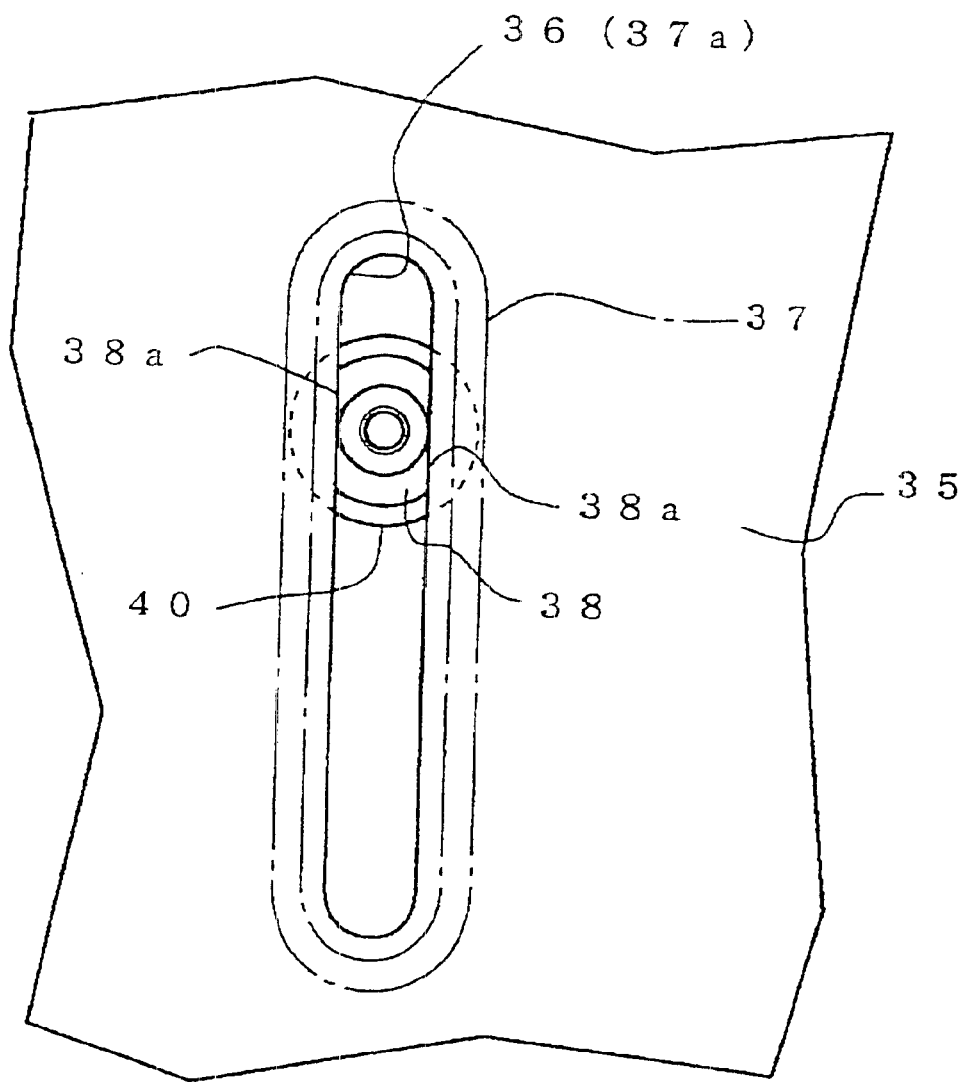
FIG. 7 is a front view of the connecting structure, partly omitted, of the meter visor and the windshield.
Figure 8:
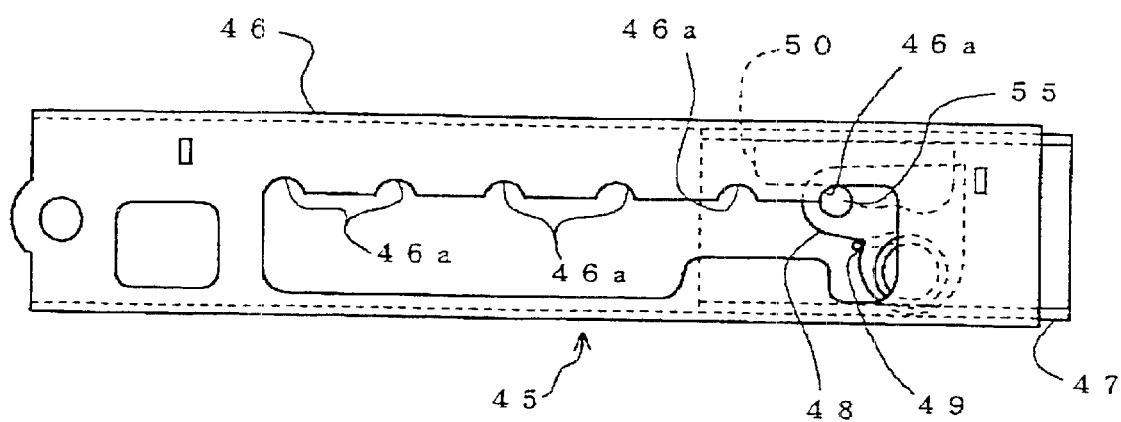
FIG. 8 is a bottom view of the present invention showing the ratchet mechanism.

In addition to supporting the windshield 9, the meter visor 35 provides for up and down movement of the windshield. To accomplish this, as shown in FIGS. 5 to 7, meter visor 35 is provided with a plurality of long guide holes 36 formed along the direction of movement of the windshield 9. The windshield 9 is fitted with a guide plate 37 having guide holes 37a of about the same shape as the guide holes 36. These guide holes 37a are formed in positions corresponding to each guide hole 36.

As shown in FIGS. 6 and 7, each guide hole 36 of the meter visor 35, is slidably fitted with a slider 38. As shown in FIG. 6, when the windshield 9 is placed over the meter visor 35, each slider 38 has a guide projection 39 which fits into a corresponding guide hole 37a of the guide plate 37.

Further, on the opposite sides of the guide projections 39, each slider 38 is integrally formed with a flange 40 having a larger outside diameter than the width of the guide hole 36 formed in the meter visor 35. The flange 40 slidably contacts the backside of the meter visor 35 to prevent the slider 38 from sliding off toward the surface side of the meter visor 35. Parallel guide surfaces 38a having a width a little smaller than the width of the guide hole 36 are formed on the slider 38 for fitting the sliders into the guide holes 36 of the meter visor 35. As shown in FIG. 7, these guide surfaces 38a contact the parallel inside surfaces of the guide holes 36. As shown in FIG. 5, C-rings 41 fitted from the surface side of the meter visor prevent dislocation of the sliders 38 from the meter visor 35. Since the flat surfaces 38a of the sliders 38 contact the guide holes 36, the sliders 38 are restrained from a changing position during sliding, thus insuring a smooth sliding motion.

Further, guide projections 39 are formed a little higher than the thickness of the guide plate 37. Lock bolts 42 are inserted from the surface side into the guide holes 37a of the guide plate 37 and screwed onto guide projections 39. The head of each lock bolt 42 has an outside diameter larger than the width of the guide holes 37a of the guide plates 37, thereby slidably mounting the sliders 38 to the windshield 9.

Since the windshield 9 is slidably installed in nearly surface contact with the meter visor 35, a friction-reducing sheet is affixed on the contact surface in order to insure smooth sliding. As shown in FIG. 6(A), the friction reducing sheet composed of a material such as polyethylene film 43 is affixed on the back surface of the windshield 9, and a material such as an ultrahigh molecular weight polyethylene tape 44 is affixed on the surface of the meter visor 35.

Further, in the present embodiment, a ratchet mechanism 45 is provided for adjusting the position of movement of the windshield 9 to a plurality of predetermined positions. As shown in FIG. 3, the ratchet mechanism 45 is situated in an open back side of the housing box 18 attached to second stay 14. The ratchet mechanism connects to the windshield 9 through the guide hole 18a formed in the housing box 18 and the guide hole 35a formed in the meter visor 35.

More specifically, as shown in FIGS. 3 to 8, the ratchet mechanism 45 is comprised of a base plate 46 having a plurality of locking recesses 46a and a movable member 47 mounted slidable along the direction of length on the base plate 46. The ratchet mechanism also includes a first cam member 48 rotatably mounted on the movable member 47 within a plane parallel with the direction of sliding, an elastic member 49 elastically pressing the first cam member 48 toward the locking recess 46a, and a second cam member 50 cooperating with the first cam member 48.

As shown in FIG. 3, the movable member 47 is formed in an inverted U-shape. Installed within the movable member are the first cam member 48, the elastic member 49, and the second cam member 50. A pair of projections 51 protrude from the movable member to fit into the windshield 9, slidably passing through the guide hole 18a of the housing box 18 and the guide hole 35a of the meter visor 35.

Windshield 9 is provided with a reinforcing plate 52 on the backside, and is attached with the connecting seat 53 inserted from the outside surface of the windshield. Windshield 9 is held in between the reinforcing plates 52 and the connecting seat 53. Bolts 54 mounted through these components are screwed onto the projections 51 of the movable member 47 which projects out of the guide hole 35a, thereby securing the windshield 9 to the ratchet mechanism 45. Further, the first cam member 48 has an engaging projection 55 projecting along a direction orthogonal to the direction of rocking, and is pushed by the elastic force of the elastic member 49 for engaging with the locking recess 46a formed in the base plate 46.

In FIG. 2, a seal member 56 is attached along the entire length of upper end edge section of the cowling 8, covering a clearance between the cowling 8 and the windshield 9.

The back side of the meter visor 35 contacts the upper surface of the connecting plates 20 on both ends of the second stay 14 and the housing box 18. As shown in FIG. 4, extended portions 20a and 18b are provided on the upper part of the connecting plate 20 and the upper part of the housing box 18, for increasing the supporting surface area of the meter visor 35.

To adjust the height of the windshield in the present embodiment, the operating lever 31 of the rocking mechanism 27 is turned upwardly. As shown in FIG. 2, this turns the center of the forward end of the pressing portion 12a of the retaining plate 12 upwardly. Since the cowling 8 is mounted on the retaining plate 12, moving the retaining plate away from the windshield also moves the cowling and seal member 56 away from the windshield. As a result, the windshield 9 is unlocked and ready to be moved.

The windshield 9 is held in its original position by the locking recess 46a which is engaged with the engaging projection 55 at the ratchet mechanism 45. Subsequently, when the windshield 9 is moved upwardly or downwardly, movable member 47 of the ratchet mechanism 45 connected to the windshield is moved. This turns the first cam member 48 against the elastic force of the elastic member 49, thus disengaging the engaging projection 55 from one locking recess 46a. Then as the windshield 9 is further moved, the engaging projection 55 is moved into engagement with the adjacent locking recess 46a. Repeating this operation moves the windshield 9 to a desired level. With the windshield 9 raised to a desired level, the engaging projection 55 engages with one of the locking recesses 46a, thereby holding the windshield 9 in this position.

As described above, as the windshield 9 is being adjusted from one position to another, it is released from contact with the retaining plate 12 and the seal member 56. Nonetheless, to permit the windshield 9 to be moved smoothly and with as little resistance as possible, a friction reducing sheet consisting of polyethylene film 43 is affixed on the surface of the windshield 9 facing the meter visor 35. Similarly, an ultrahigh molecular weight polyethylene tape 44 is affixed on the surface of the meter visor facing the windshield.

After the windshield 9 is moved into a new position, the operating lever 31 of the rocking mechanism 27 is turned downwardly, as shown in FIG. 2. By turning the operating lever 31 downwardly, the pressing portion 12a of the retaining plate 12 is moved toward the windshield 9, thus holding the windshield between the retaining plate 12 and the meter visor 35 located below. Also, the seal member 56 mounted at the upper end edge of the cowling 8 is pressed against the windshield 9 to seal the clearance formed between the windshield 9 and the upper end edge of the cowling 8.

With operating lever 31 turned downwardly, link rod 32 connecting operating lever 31 with link plate 29 is positioned over the center axis of pin 34 which is the center of rotation of the operating lever 31. Thus, operating lever 31 is checked from turning and loosening. The pushing force produced by the retaining plate 12 is applied to the meter visor 35 through the windshield 9. The meter visor 35 is supported on the vehicle body frame 2 through the second stay 14. As a result, the windshield 9 is reliably fixed in its new position.

In the present embodiment, the retaining plate 12 is provided as the reinforcing member inside of the cowling 8. Windshield 9 is securely sandwiched between the retaining plate 12 and the vehicle body frame 2 (in the present embodiment, the meter visor 35 is mounted at the front of the vehicle body frame 2). This simple construction improves the freedom of vehicle design, particularly, the freedom of design of exterior components such as the cowling 8.

In the present embodiment, the windshield 9 is supported by the ratchet mechanism 45. Therefore, even when the windshield 9 is unlocked from the retaining plate 12, the windshield 9 can be held in a temporarily fixed state. Thus, it is possible to easily adjust the height of the windshield 9.

Also, the housing box 18 is connected to the first stay 13 by means of the reinforcing plate 23 positioned at its intermediate portion. The reinforcing plate prevents deformation of the second stay 14, while at the same time increasing its strength for holding the windshield 9.

In summary, the windshield mounting structure of the present invention provides for a retaining plate disposed at the front, to support the cowling so that the windshield may be sandwiched and secured between the retaining plate and the vehicle body frame. The present invention also provides for adjusting the height of the windshield to a plurality of predetermined positions, and then securing the windshield in place in any of these positions. Further, restrictions put on the material and design of the exterior components at the front of the vehicle, such as the cowling, are reduced, thereby improving the freedom of design of the vehicle.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A windshield mounting structure for vehicles in which a windshield is mounted between a vehicle body frame and a cowling attached at a front of said vehicle body frame, comprising:

a retaining plate fixed to said cowling, said retaining plate being rockably supported on a front part of said vehicle body frame, opposite to a front of said windshield; and a rocking mechanism for moving said retaining plate toward and away from said windshield, said rocking mechanism being mounted on said vehicle body frame behind said windshield and said rocking mechanism being operable by a rider of said vehicle, wherein said windshield is slidably mounted between said vehicle body frame and said cowling to provide for vertical movement of said windshield in a direction of a windshield surface.

2. The windshield mounting structure for vehicles according to claim 1, further comprising:

a first stay attached to a head pipe at a front of said vehicle and extending forward; and a second stay disposed above and attached to said first stay for mounting said retaining plate and said rocking mechanism.

3. The windshield mounting structure for vehicles according to claim 2, wherein said retaining plate includes a support portion fitted in a support pin projecting upwardly at a lower end part of said second stay, said support portion being rockably supported in a nearly vertical plane on the center of said support pin.

4. The windshield mounting structure for vehicles according to claim 1, wherein said rocking mechanism is located between a right rearwardly projecting end and a left rearwardly projecting end of the retaining plate to thereby move a pressing portion of the retaining plate toward and away from said windshield.

5. The windshield mounting structure for vehicles according to claim 1, said rocking mechanism comprising:

a link plate rockably attached to a second stay for moving said retaining plate toward and away from said windshield;

an operating lever for rotatably actuating said link plate; and a link rod for transmitting a rotational motion of the operating lever to the link plate, wherein said link plate prevents said operating lever from turning, thus locking said retaining plate in place tightly against the stay.

6. The windshield mounting structure for vehicles according to claim 1, further comprising a ratchet mechanism disposed between said windshield and said vehicle body frame, for adjusting a vertical position of said windshield to a plurality of positions.

7. The windshield mounting structure for vehicles according to claim 2, further comprising a meter visor located behind said windshield, said meter visor being attached to said second stay and being provided with a plurality of guide holes for supporting and vertically moving said windshield.

8. The windshield mounting structure for vehicles according to claim 7, further comprising a friction reducing sheet affixed on a contact surface of said windshield and a contact surface of said meter visor.

9. The windshield mounting structure of vehicles according to claim 8, wherein said friction reducing sheet affixed on said contact surface of said windshield is a polyethylene film.

10. The windshield mounting structure of vehicles according to claim 8, wherein said friction reducing sheet affixed on said contact surface of said meter visor is an ultrahigh molecular weight polyethylene tape.

* * * * *